United States Patent
Schmid et al.

(10) Patent No.: US 8,840,231 B2
(45) Date of Patent: Sep. 23, 2014

(54) INK-JET PRINTING METHODS COMPOSITIONS PROVIDING IMPROVED IMAGE DURABILITY

(75) Inventors: Christian Schmid, Rancho, CA (US); Richard B. Anderson, Escondido, CA (US); Yi-Hua Tsao, San Diego, CA (US); Ervin Muberekyan, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2652 days.

(21) Appl. No.: 11/243,949

(22) Filed: Oct. 4, 2005

(65) Prior Publication Data
US 2007/0076075 A1 Apr. 5, 2007

(51) Int. Cl.
G01D 11/00 (2006.01)
B41J 2/01 (2006.01)
C09D 11/30 (2014.01)
C09D 11/54 (2014.01)

(52) U.S. Cl.
CPC .................................. *C09D 11/54* (2013.01); *C09D 11/30* (2013.01)
USPC .......................................... 347/100; 347/102

(58) Field of Classification Search
USPC ............... 347/102, 100; 523/160; 106/31.13, 106/31.6, 31.27, 31.48
See application file for complete search history.

(56) References Cited

U.S. PATENT DOCUMENTS

| | | | |
|---|---|---|---|
| 3,597,374 A * | 8/1971 | Nagan | 524/48 |
| 4,267,088 A * | 5/1981 | Kempf | 523/420 |
| 5,147,557 A | 9/1992 | Purnell | |
| 5,310,778 A * | 5/1994 | Shor et al. | 524/556 |
| 5,560,982 A * | 10/1996 | Sato | 428/32.13 |
| 6,280,591 B1 * | 8/2001 | Akutsu et al. | 204/471 |
| 6,528,119 B1 | 3/2003 | MacMillan | |
| 6,613,134 B1 | 9/2003 | Azuma | |
| 6,827,771 B2 | 12/2004 | Omatsu et al. | |
| 6,835,240 B2 | 12/2004 | Nishita et al. | |
| 2002/0081421 A1 * | 6/2002 | Bagwell et al. | 428/195 |
| 2003/0008080 A1 * | 1/2003 | Doi et al. | 427/466 |
| 2003/0081227 A1 * | 5/2003 | Williams et al. | 358/1.8 |
| 2004/0043691 A1 * | 3/2004 | Abe et al. | 445/24 |
| 2004/0063808 A1 * | 4/2004 | Ma et al. | 523/160 |
| 2004/0257416 A1 * | 12/2004 | Kim et al. | 347/100 |
| 2005/0088498 A1 * | 4/2005 | Parazak et al. | 347/96 |

FOREIGN PATENT DOCUMENTS

| | | |
|---|---|---|
| EP | 1 034 940 A1 | 9/2000 |
| EP | 1 155 870 A2 | 11/2001 |
| EP | 1 239 025 A2 | 9/2002 |
| EP | 1 243 435 A1 | 9/2002 |
| EP | 1 486 541 A1 | 12/2004 |
| JP | 05-148775 A | 6/1993 |
| JP | 11020304 A * | 1/1999 |
| JP | 2005161842 | 6/2005 |
| WO | WO 99/64249 A | 12/1999 |

* cited by examiner

*Primary Examiner* — Sarah Al Hashimi

(57) ABSTRACT

Compositions, systems, and methods for providing smudge resistant and durable ink-jet images having good optical density are provided. Specifically, a system for printing durable ink-jet ink images can comprise a first ink-jet pen containing an ink-jet ink and a second ink-jet pen containing a fixer composition. The ink-jet ink can comprise a first liquid vehicle and a colorant. The fixer composition can comprise a second liquid vehicle, and from 0.5 wt % to 5 wt % of a cationic copolymer of an epihalohydrin and an amine. Upon overprinting or underprinting the fixer composition with respect to the ink-jet ink on a substrate, a durable image can be formed.

13 Claims, No Drawings

INK-JET PRINTING METHODS COMPOSITIONS PROVIDING IMPROVED IMAGE DURABILITY

FIELD OF THE INVENTION

The present invention is drawn to the area of ink-jet imaging. More specifically, the present invention is drawn to ink-jet imaging using fixer compositions which include copolymers of an epihalohydrin and an amine.

BACKGROUND OF THE INVENTION

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. However, though there has been great improvement in inkjet printing, accompanying this improvement are increased demands by consumers in this area, e.g., higher speeds, higher resolution, full color image formation, increased stability, more permanent images, etc.

In general, ink-jet inks are either dye- or pigment-based inks. Both are typically prepared in a liquid vehicle that contains the dye and/or the pigment. Dye-based ink-jet inks have been a dominant technology in the ink-jet ink arena. However, as many dyes are water-soluble, images printed using many of such dye-based ink jet inks are not as water fast as may be desirable. The water fastness of an anionic dye-based ink-jet ink printed on media has been shown to be enhanced by overprinting or underprinting the printed image with a fixer fluid including cationic material. Thus, when the cationic polymer and the anionic dye contact one another on a substrate, a reaction between the dye and the cationic material creates an image with improved water fastness and permanence. However, many of these materials do not exhibit acceptable reliability in standard printheads, and further, show yellowing when printed on paper.

SUMMARY OF THE INVENTION

It has been recognized that the use of certain components in ink-jet inks and/or fixer fluids can provide good image permanence and smudge resistance without adversely affecting ink-jet architecture reliability and exhibiting excessive yellowing. In accordance with this recognition, a system for printing durable ink-jet ink images can comprise a first ink-jet pen containing an ink-jet ink and a second ink-jet pen containing a fixer composition. The ink-jet ink can comprise a first liquid vehicle and a colorant. The fixer composition can comprise a second liquid vehicle and from 0.5 wt % to 5 wt % of a cationic copolymer of an epihalohydrin and an amine. Thus, upon overprinting or underprinting the fixer composition with respect to the ink-jet ink on a substrate, a durable image is formed.

In another embodiment, a method for printing durable ink-jet ink images can comprise jetting an ink-jet ink onto a substrate and also jetting a fixer composition onto the substrate. The ink-jet ink can comprise a first liquid vehicle and a colorant. The fixer composition can comprise a second liquid vehicle and from 0.5 wt % to 5 wt % of a cationic copolymer of an epihalohydrin and an amine. In this embodiment, the ink-jet ink can be overprinted or underprinted with respect to the fixer composition on the substrate.

In another embodiment, a fixer composition can comprise an aqueous liquid vehicle, and from 0.5 wt % to 5 wt % of a cationic copolymer of an epihalohydrin and an amine. The fixer composition can be configured to be ink-jettable and free of pigment and dye colorant.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle" refers to the fluid in which colorants (dyes and/or pigments) are dissolved or dispersed to form inkjet inks, or refers to the fluid in which certain cationic polymers are dispersed to form ink-jettable fixer compositions. Many liquid vehicles and vehicle components are known in the art, and may include a mixture of a variety of different agents, including without limitation, surfactants, solvents, co-solvents, buffers, biocides, viscosity modifiers, sequestering agents, stabilizing agents, and water. The liquid vehicle can also carry other additives such as polymers, UV curable materials, and/or plasticizers in certain embodiments.

"Cationic components," when referring to a dispersant or a solute within a fixer composition, refer to polymers, multivalent ions, and/or the like, that are positively charged and act to fix or desolubilize a colorant within as ink-jet ink upon contact on a substrate. In accordance with embodiments of the present invention, the cationic component can include a copolymer of an epihalohydrin and an amine.

"Fixer" refers to liquid suspensions or solutions that include a liquid vehicle and at least one cationic component. In further detail, the fixer compositions of the present invention include, at least, a copolymer of an epihalohydrin and an amine, but can also include other cationic components as well.

The term "epihalohydrin" refers to compositions having the following structure:

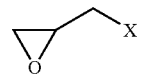

where X is a halogen atom, such as fluorine, chlorine, bromine, iodine, etc. An epichlorohydrin is one example of an epihalohydrin. It is to be noted that epihalohydrins and amines can be copolymerized to form specific types of hydroxyl- and quaternary amine-containing polymers with halogen counterions.

"Self-dispersed pigment" refers to pigments that have been chemically surface modified with a charge or a polymeric grouping, wherein the chemical modification aids the pigment in becoming and/or substantially remaining dispersed in a liquid vehicle.

"Polymer-dispersed pigment" refers to pigments that utilize a dispersant (which can be a polymer, an oligomer, or a surfactant, for example) in a liquid vehicle and/or pigments that utilize a physical coating to aid the pigment in becoming and/or substantially remaining dispersed in a liquid vehicle.

The term "about" when referring to a numerical value or range is intended to encompass the values resulting from experimental error that can occur when taking measurements.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

With this in mind, the present invention is drawn to the area of ink-jet imaging. More specifically, the present invention is drawn to a system for printing durable ink-jet ink images, which can comprise a first ink-jet pen containing an ink-jet ink and a second ink-jet pen containing a fixer composition. The ink-jet ink can comprise a first liquid vehicle and a colorant. The fixer composition can comprise a second liquid vehicle and from 0.5 wt % to 5 wt % of a cationic copolymer of an epihalohydrin and an amine. Thus, upon overprinting or underprinting the fixer composition with respect to the ink-jet ink on a substrate, a durable image is formed.

In another embodiment, a method for printing durable ink-jet ink images can comprise jetting an ink-jet ink onto a substrate and also jetting a fixer composition onto the substrate. The ink-jet ink can comprise a first liquid vehicle and a colorant. The fixer composition can comprise a second liquid vehicle and from 0.5 wt % to 5 wt % of a cationic copolymer of an epihalohydrin and an amine. In this embodiment, the ink-jet ink can be overprinted or underprinted with respect to the fixer composition on the substrate.

In another embodiment, a fixer composition can comprise an aqueous liquid vehicle, and from 0.5 wt % to 5 wt % of a cationic copolymer of an epihalohydrin and an amine. The fixer composition can be configured to be ink-jettable and free of pigment and dye colorant.

With respect to each of the system, method, and composition described herein, in one embodiment, the fixer composition (and optionally, the ink-jet ink composition) can be configured for firing or jetting from thermal ink-jet architecture. Thermal ink-jet systems are quite different in their jetting properties than piezo ink-jet systems. As such, polymers that are effective for use in piezo ink-jet systems are not necessarily effective for use with thermal ink-jet ink systems. However, the converse is not necessarily true. In other words, polymers that work well with thermal ink-jet systems are more likely to work with piezo systems than vice versa. Therefore, the selection of polymers for use with thermal ink-jet systems often requires more care, as thermal ink-jet systems are less forgiving than piezo ink-jet systems. As such, the polymers and other components used in both the ink-jet inks and the fixer compositions of the present invention are particularly adapted for use with thermal ink-jet ink systems, though they are functional with piezo ink-jet ink systems as well. In other words, even in the relatively sensitive systems of thermal ink-jet architecture, copolymers of epihalohydrins and amines can be effectively jetted with acceptable decap performance compared to other cationic copolymers currently known in the art. For example, a copolymer of epichlorohydrin and dimethyl amine (Floquat FL-14, from SNF Floerger) printed at drop volumes from about 4 to 9 exhibit superior decap performance when compared to fixer compositions that include poly(hexamethylene guanidine) (from Avecia), poly(DADMAC) (from Aldrich), or poly(vinylamine) (Lupamin 1595, from BASF).

When selecting the amine composition to be used to form the copolymer in accordance with embodiments of the present invention, it is to be noted that primary and secondary amines are preferable for use. Secondary amines, such as dimethyl amine, are useful in preparing linear copolymers, whereas primary amines, such as monomethyl amine, can add branches into the copolymer. Thus, by including both primary amines and secondary amines, some groups of the copolymer tend to promote linear copolymerization, and other groups of the copolymer tend to introduce branching. By including all primary amines, the branching would be much more significant than in embodiments where both primary amines and secondary amines are introduced together. When including both primary amines and secondary amines as the amine component of the copolymer, in one embodiment, the molar ratio of secondary amines to primary amines can be from about 100:1 to 10:1, thereby providing branching at a desired magnitude.

Exemplary fixer compositions that can be prepared in accordance with embodiments of the present invention can include from 50 wt % to 95 wt % water, from 5 wt % to 35 wt % of water-soluble cosolvent(s) (optionally, with a vapor pressure less than water), from 0 wt % to 5 wt % of a water miscible surfactant (and more specifically, from 0.05 wt % to 2 wt %), and from 0.5 wt % to 5 wt % of the copolymer of the epihalohydrin and the amine. The amine can be a secondary amine, or a combination of secondary amines and primary amines, as described above. When selecting the copolymer of the epihalohydrin and amine, the molecular weight range can be such that the viscosity of a 50 wt % aqueous solution (50 wt % water and 50 wt % copolymer) has a viscosity range of 5 to 10,000 cp at room temperature. In another embodiment, the molecular weight range can be such that the viscosity of a 50 wt % aqueous solution (50 wt % water and 50 wt % copolymer) has a viscosity range of 10 to 100 cp at room temperature. This (viscosity) convention is used as determining actual molecular weight is difficult with these types of polymers.

In addition to the copolymer of the epihalohydrin and the amine, other cationic components can also be present in the fixer compositions. For example, the fixer composition can include a second cationic component, such as a multivalent salt, another cationic polymer or copolymer, etc. Exemplary multivalent salts that can be used include multivalent metal nitrates, EDTA salts, phosphonium halide salts, salts of organic acids, and combinations thereof.

With respect to the ink-jet ink, any of a number of components can be present that are effective for use with thermal ink-jet ink technologies. For example, the liquid vehicle of the ink can comprise an effective amount of water, e.g., from 50 wt % to 95 wt % water, from 0 wt % to 5 wt % of a surfactant (preferably, from 0.05 wt % to 5 wt %), from 5% to 50% of cosolvent(s), from 0 wt % to 2 wt % biocide. Other components can also be present as described with respect to liquid vehicle components herein. Multiple liquid vehicle components of a single class can also be present, such as multiple solvents, multiple surfactants, etc.

Of the colorants that can be used, dyes and/or pigments can benefit from their use with the fixer compositions of the present invention. Anionic dyes, in particular are of interest, but any dyes that can favorably interact with the cationic components of the fixer composition can be used. Further, various types of pigments can also be used, such as self-dispersed pigments and/or dispersant or polymer dispersed pigments. If dispersant or polymer dispersed pigment is used, then the liquid vehicle can further comprise a dispersing agent, or the pigment can be physically coated with a dispersing agent, as is known in the art. Self-dispersed pigments, on the other hand, do not require the use of a separate dispersant composition, as the dispersant composition is typically covalently or physically attached to the pigment.

As mentioned, the methods and systems of the present invention benefit from a printing technique referred to as overprinting or underprinting. Thus, the fixer composition can be underprinted with respect to the ink-jet ink, or alternatively, the fixer fixer composition can be overprinted with respect to the ink-jet ink.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Preparation of Ink-jet Ink Composition

An ink-jet ink comprising a pigment and a dye was prepared in accordance with Table 1, as follows:

TABLE 1

| Ink-jet ink | |
|---|---|
| component | wt % |
| Tripropylene glycol | 9 |
| 2-hydroxyelthyl-2-imidizolidinone | 6 |
| 2-hydroxyethyl-2-pyrrolidone | 10 |
| Phosphate ester surfactant | 0.5 |
| Medium HLB nonionic surfactant | 0.75 |
| Nonionic fluorosurfactant | 0.2 |
| biocide | 0.2 |
| EDTA di Na salt | 0.05 |
| Styrene-acrylic copolymer | 0.4 |
| Polymer dispersed cyan pigment | 2.625 |
| Acid Blue 9 dye (Na salt) | 0.375 |
| Water | balance |

Example 2

Preparation of Fixer Fluid Including EPI/DMA Copolymer

An ink-jettable fixer composition comprising a copolymer of epichlorohydrin and dimethylamine (EPI/DMA) was prepared in accordance with Table 2, as follows:

TABLE 2

| EPI/DMA-containing fixer composition | |
|---|---|
| component | wt % |
| 4-methylmorpholine-N-oxide | 18 |
| EHPD | 8 |
| Nonionic fluorosurfactant | 0.1 |
| Nonionic surfactant | 0.9 |
| Floquat FL-14 (Cl−) (EPI/DMA) | 2 |
| Water | balance |

[1]Adjusted to pH 4 with methanesulfonic acid
[1]Low pH (below pH 6) is desirable to fix pigments, but is not necessary to fix dyes.

Example 3

Water Fastness with and Without the Use of Fixer Composition

Cyan area fills (1 cm by 2 cm rectangles) were prepared by printing 6 pL per dp6 of the fixer composition of Example 2, followed by overprinting 12 pL per dp6 of the ink-jet ink of Example 1, where dp6 is $(1/600 \text{ in})^2$. At this coverage, the color has an acceptable appearance, where the cyan saturations ($s^* = c^*/L^*$) range from ~1.2 on Fortune Matte to ~1.0 on Exact Matte. For comparison, the same cyan area fills were prepared, but without the use of the fixer composition. This same process was followed on various pages of media, and each of the pages was allowed to sit for a different period of time before conducting the water fastness test of the present example.

The water fastness test was conducted by inclining each printed page at a 45° angle from horizontal and dropping a small amount (25 μL) of water onto each color square. Water was allowed to run over the cyan area, off the sheet, and the sheet was allowed to dry. The drip transfer measurements were recorded in milli-OD (with media OD subtracted) for the (initially white) areas below the square. Thus, a larger number indicates a greater transfer of ink from the printed area to the white areas of the print media. In other words, a greater number indicates poorer water fastness. Tables 3a-3c below show the results, as follows:

TABLE 3a

| Water fastness 20 minutes after printing (cyan 12 pL) | | |
|---|---|---|
| Media | No Fixer (mOD) | EPI/DMA fixer (mOD) |
| Aero Gloss | 130 | 90 |
| Exact Matte | 330 | 120 |
| Fortune | 190 | 30 |
| Lustro Gloss | 90 | 70 |
| Silver image matte | 170 | 50 |

TABLE 3b

| Water fastness 1 hour after printing (cyan 12 pL) | | |
|---|---|---|
| Media | No Fixer (mOD) | EPI/DMA fixer (mOD) |
| Aero Gloss | 110 | 60 |
| Exact Matte | 320 | 90 |
| Fortune | 140 | 20 |
| Lustro Gloss | 70 | 20 |
| Silver image matte | 130 | 30 |

TABLE 3c

Water fastness 24 hours after printing (cyan 12 pL)

| Media | No Fixer (mOD) | EPI/DMA fixer (mOD) |
|---|---|---|
| Aero Gloss | 60 | 20 |
| Exact Matte | 140 | 50 |
| Fortune | 110 | 20 |
| Lustro Gloss | 80 | 70 |
| Silver image matte | 70 | 40 |

As apparent from Tables 3a-3c, the use of the EPI/DMA fixer significantly improves the drip performance compared similarly printed images without the use of the EPI/DMA fixer.

Example 4

Decap Performance of EPI/DMA-containing Fixers Over Other Copolymeric Fixers Decap performance tests were run to determine whether the decap performance of an EPI/DMA-containing fixer (of Example 2) would compare favorably against other known polymers commonly used in fixers (prepared similarly as exemplified in Example 2, except that the cationic polymer used was different). Decap tests were carried out where print heads were forced to sit idle and uncapped for various time intervals, i.e. 60 seconds and 180 seconds. Following those time intervals, solid area fills were printed while the printhead moved laterally across the page. The distance into this area fill where the pen had recovered satisfactorily, i.e. where the majority of nozzles began firing well, was then recorded. The lower this number, the better the decap performance. The EPI/DMA-containing fixer composition had equal or better decap performance than four other commonly used fixer polymers, as shown in Table 4 below:

TABLE 4

Decap performance

| Polymer | Mw | 60 sec decap (mm) | 180 sec decap (mm) |
|---|---|---|---|
| EPI/DMA (Floquat FL-14, from SNF Floerger) | 25,000 | 1 | 2 |
| poly(hexamethylene guanidine) (Avecia) | 1,800 | 5 | 12 |
| poly(DADMAC) (Aldrich) | <100,000 | 1 | 11 |
| poly(ethyleneimine) (Lupasol FG, from BASF) | 800 | 1 | 2 |
| poly(vinylamine) (Lupamin 1595, from BASF) | <10,000 | 3 | 10 |

As can be seen from Table 4, the decap performance of EPI/DMA-containing fixer compared favorably against each of the other polymers, with only poly(ethyleneimine) matching the performance of the EPI/DMA copolymer.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A fixer composition, comprising:
   (a) an aqueous liquid vehicle, and
   (b) from 0.5 wt % to 5 wt % of a cationic copolymer of an epihalohydrin and an amine, said fixer composition being ink-jettable and free of pigment and dye colorant.

2. A fixer composition as in claim 1, wherein the fixer composition is ink-jettable from thermal ink-jet architecture at a drop volume from 4 to 9 picoliters.

3. A fixer composition as in claim 1, wherein the amine is a secondary amine.

4. A fixer composition as in claim 3, wherein the cationic copolymer is a linear copolymer.

5. A fixer composition as in claim 3, wherein the secondary amine is dimethyl amine.

6. A fixer composition as in claim 1, wherein the amine is combination of a primary amine and a secondary amine.

7. A fixer composition as in claim 6, wherein the primary amine is monomethyl amine.

8. A fixer composition as in claim 6, wherein the cationic copolymer is a branched copolymer.

9. A fixer composition as in claim 1, wherein the fixer composition further comprises a second cationic component.

10. A fixer composition as in claim 9, wherein the second cationic component is a multivalent salt.

11. A fixer composition as in claim 9, wherein the multivalent salt is selected from the group consisting of multivalent metal nitrates, EDTA salts, phosphonium halide salts, salts of organic acids, and combinations thereof.

12. A fixer composition as in claim 1, wherein the cationic copolymer is substantially solubilized in the second aqueous liquid vehicle.

13. A fixer composition as in claim 1, wherein the epihalohydrin is epichlorohydrin.

\* \* \* \* \*